(12) United States Patent
Yu et al.

(10) Patent No.: US 10,452,705 B2
(45) Date of Patent: Oct. 22, 2019

(54) SYSTEM, METHOD, AND NON-TRANSITORY COMPUTER-READABLE STORAGE MEDIA FOR EVALUATING SEARCH RESULTS

(71) Applicant: Wal-Mart Stores, Inc., Bentonville, AR (US)

(72) Inventors: Chihung Yu, Santa Clara, CA (US); Yan Zheng, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 772 days.

(21) Appl. No.: 14/954,512

(22) Filed: Nov. 30, 2015

(65) Prior Publication Data
US 2017/0154113 A1    Jun. 1, 2017

(51) Int. Cl.
*G06F 16/438*    (2019.01)
*G06F 11/36*    (2006.01)

(52) U.S. Cl.
CPC ........ *G06F 16/438* (2019.01); *G06F 11/3672* (2013.01)

(58) Field of Classification Search
None
See application file for complete search history.

(56) References Cited

U.S. PATENT DOCUMENTS

| | | | |
|---|---|---|---|
| 2005/0144259 A1* | 6/2005 | Buckley | G06F 16/95 709/219 |
| 2010/0174736 A1* | 7/2010 | Goodall | G06F 17/30864 707/769 |
| 2015/0310100 A1* | 10/2015 | Bursey | G06F 17/30864 707/706 |

OTHER PUBLICATIONS

U.S. Appl. No. 14/633,022, filed Feb. 26, 2015 entitled "System, Method, and Non-Transitory Computer-Readable Storage Media for Displaying Product Information on Websites".
U.S. Appl. No. 14/671,817, filed Mar. 27, 2015 entitled "System, Method, and Non-Transitory Computer-Readable Storage Media for Displaying Product Information on Websites".

* cited by examiner

*Primary Examiner* — James Trujillo
*Assistant Examiner* — John J Morris
(74) *Attorney, Agent, or Firm* — Bryan Cave Leighton Paisner LLP

(57) ABSTRACT

A system, method and computer product for allowing users to evaluate search results from one or more search engine, including the logic and data associated with the search engine in evaluation windows displayed relative to the displayed search results.

26 Claims, 8 Drawing Sheets

SYSTEM, METHOD, AND NON-TRANSITORY COMPUTER-READABLE STORAGE MEDIA FOR EVALUATING SEARCH RESULTS

FIELD OF THE DISCLOSURE

The present invention relates to search engines, and more particularly, to systems, methods, and computer-readable storage media that allows users to evaluate the search engine, including the logic and data associated with the search engine. The suggested class/subclass of the disclosure is: CLASS 707/722 (DATA PROCESSING: DATABASE, DATA MINING, AND FILE MANAGEMENT OR DATA STRUCTURES/Post processing of search results) and the suggested Art Unit is 2161.

BACKGROUND

Search engines are used throughout the World Wide Web and Internet, including, but not limited to social networks, general Internet searches, e.g., Google, Yahoo, Bing, etc. . . . , and retail commercial websites. Search engines are also used to manage human resources databases, inventory database, and the like. Such systems typically include the search engine logic, the database, front end logic, and any business or other logic that may be used to present or organize the search engine results.

The data in the database and the logic comprising such systems are almost always constantly improved or updated. Generally, it is typically desirable to evaluate such systems either prior to roll-out of updates or improvements or post-production. It may also be desirable to evaluate systems provided by different parties so that a comparison may be made.

Such evaluations may be performed by users in specially designed testbeds that include a copy or mimicked version of the system to be evaluated. The evaluation set or criteria is established and presented to the user(s) as the user perform specified functions, e.g., specific search requests. The evaluation set may be presented to the user in a manner that allows the user to enter their evaluation, which is then tabulated with the evaluations from other users. The tabulated results may be reviewed. It is extremely time consuming to produce a mimicked version of the system.

Further, typically providing the access necessary for such an evaluation of another party's system, or website, may be very difficult.

The present invention is aimed at one or more of the problems identified above.

SUMMARY OF THE INVENTION

In different embodiments of the present invention, systems, methods, and computer-readable storage media allow users to provide an evaluation of a system that includes a database and search engine is provided.

In one aspect of the present invention, a system including a memory device, an evaluation script unit, an evaluation window unit, and a data unit is provided. The memory device is configured to store an evaluation script and an evaluation set. The evaluation set defines an evaluation to be performed by a user with respect to search engine results corresponding to a predefined search on a first search engine. The evaluation script unit is configured to receive a search engine search request and to detect a reference to the evaluation script in the search engine search request. In response to detecting the reference to the evaluation script, the evaluation script unit retrieves the evaluation script from the memory device. The first search engine results corresponding to the predefined search on the first search engine are displayed to the user in a first search results page. The evaluation window unit displays to the user a first evaluation window relative to the first search results. The first evaluation window allows the user to enter evaluation data of the first search results as defined by the evaluation set. The data unit receives evaluation data entered by the user and stores the evaluation data in the memory device.

In another embodiment of the present invention, a method is provided. In a first step, In still another embodiment of the present invention, one or more non-transitory computer-readable storage media, having computer-executable instructions embodied thereon, wherein when executed by at least one processor, the computer-executable instructions cause the processor to operate as a memory device, an evaluation script unit, an evaluation window unit, and a data unit is provided. The memory device is configured to store an evaluation script and an evaluation set. The evaluation set defines an evaluation to be performed by a user with respect to search engine results corresponding to a predefined search on a first search engine. The evaluation script unit is configured to receive a search engine search request and to detect a reference to the evaluation script in the search engine search request. In response to detecting the reference to the evaluation script, the evaluation script unit retrieves the evaluation script from the memory device. The first search engine results corresponding to the predefined search on the first search engine are displayed to the user in a first search results page. The evaluation window unit displays to the user a first evaluation window relative to the first search results. The first evaluation window allows the user to enter evaluation data of the first search results as defined by the evaluation set. The data unit receives evaluation data entered by the user and stores the evaluation data in the memory device.

In still a further embodiment of the present invention, a system including a memory means, an evaluation script means, an evaluation window means, and a data means is provided. The memory means is configured to store an evaluation script and an evaluation set. The evaluation set defines an evaluation to be performed by a user with respect to search engine results corresponding to a predefined search on a first search engine. The evaluation script means is configured to receive a search engine search request and to detect a reference to the evaluation script in the search engine search request. In response to detecting the reference to the evaluation script, the evaluation script means retrieves the evaluation script from the memory device. The first search engine results corresponding to the predefined search on the first search engine are displayed to the user in a first search results page. The evaluation window means displays to the user a first evaluation window relative to the first search results. The first evaluation window allows the user to enter evaluation data of the first search results as defined by the evaluation set. The data means receives evaluation data entered by the user and stores the evaluation data in the memory device.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein.

Figure 1:
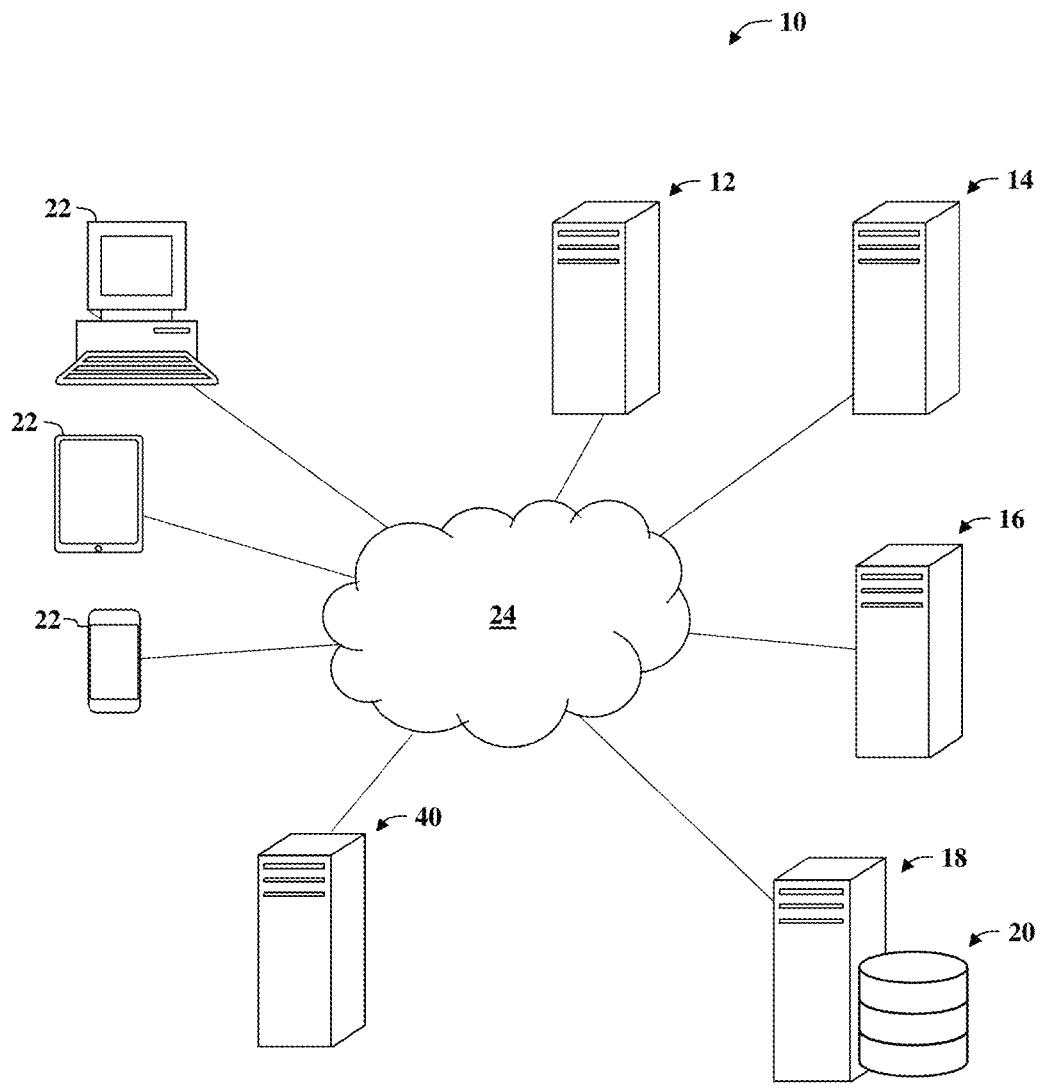
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

With reference to the FIGS. and in operation, the present invention provides a system 10, methods and computer product media that allows users to evaluate a search engine, and more particularly, the results of a search of a database using a search. In general use, the search engine allows (other) users, such as customers of a retailer, to perform a product search and to the search results, e.g., product information via a commercial product module 44, such as a website or an application, i.e., "app", running on a user device. Referring to FIG. 1, an exemplary environment in which the system 10 operates is illustrated. In the illustrated embodiment, the system 10 is configured to enable a user or customer to access a website with one or more user computing devices to view information indicative of products that may be purchase by the user via the commercial product module 44. In general, the system 10 generates and displays product lists in response to receiving a product search request from a consumer via a commercial product module 44.

In use, a search engine unit 80 (see below) generates search data including a plurality of product records as a function of the search request, and analyses the search data and generates sorted groups of product records based on one or more data categories included in the product records.

The disclosure particularly describes the system and methods, other users, i.e., evaluators, review the search engine, and more particularly, the search engine results. The parameters or characteristics that the evaluators are asked to evaluate are predefined and defined within an evaluation set (see below). In general, the system 10, in response to running a provided instruction displays the search results that are to be evaluated and automatically displays an evaluation window (see below) relative to the displayed search results. The evaluator then enters their evaluation of the displayed search results in the evaluation window. The evaluations are then stored with the evaluation set for further review and action, e.g., correction or modification of the search engine or data. For example, in one embodiment, the provided instruction is a Uniform Resource Locator (URL) that includes a reference to a script that generates the evaluation window (see below). It should be noted that search engine results could include a key word search and/or a category search or selection and/or a browse function and the like.

For example, in one embodiment, the search engine may generate search data including a plurality of product records associated with a search request received from a customer. Generally, such a search request may include a search of hundreds, if not thousands, of products. In order to provide additional information that the customer may use to narrow the search criteria and to reduce the number of products within the search results in order to produce search results that include products that are more relevant to the customer. In one embodiment, the search results may include one or more facet with a list of facet values. For example, one typical categories may include (1) the manufacturer or brand of the goods, (2) color of the goods, (3) gender (of the intended user), (4) size, and/or (5) price. One other facet may be "Category" which may include, e.g., types of goods that potentially meet the search criteria. The categories, which may also be known as "facets" are established based on the search criteria and/or products in the search results.

In addition, by automatically generating an evaluation window relative to the search results without requiring that a copy or pseudo-copy of the search engine, logic, and data, the system 10 improves the speed and functionality of known computing systems by reducing time necessary to set up and run an evaluation. Additionally, the evaluation of the search engine may be accomplished in situations where it is not possible to create a (pseudo) copy of the search engine, logic, and data. In other words, the system 10 of the present invention may be used to evaluate the search engine, logic, and data of a competitor's website.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media. An apparatus may be expressed in terms of modules and/or units that include one or more discrete hardware components or portions thereof as configured by software (in any form). Furthermore, an apparatus may take the form of one or more elements expressed as a means for performing a specified function. When expressed in such a form, the means are to be interpreted as meaning the combination of hardware components or portions thereof contained within this specification, and any equivalents thereof.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a hosting server 12, a search engine server 14, a sorting server 16, a database server 18, a database 20, one or more user computing (or customer) devices 22, and a modulator application server 40 that are each coupled in communication via a communications network 24. The communications network 24 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 22 may include any suitable device that enables a user to access and communicate with the system 10 including sending and/or receiving information to and from the system 10 and displaying information received from the system 10 to a user. For example, in one embodiment, the user computing device 22 may include, but is not limited to, a desktop computer, a laptop or notebook computer, a tablet computer, smartphone/tablet computer hybrid, a personal data assistant, a handheld mobile device including a cellular telephone, and the like. The user computing device 22 may be used to by a user, such as a customer, to perform a search or may be used by a user to perform the evaluation (evaluator).

The database server 18 includes a memory device that is connected to the database 20 to retrieve and store information contained in the database 20. The database 20 contains information on a variety of matters, such as, for example, web pages associated with one or more websites, customer account information, product records, data categories, facet values, sorted data groups, and/or any suitable information that enables the system 10 to function as described herein.

Figure 4:
FIG. 4 is an illustration of an exemplary screenshot from the system of FIG. 1, according to an embodiment of the present invention.

The hosting server 12 may be configured to host a website 26 or provide data to the app that is accessible by a user via one or more user computing devices 22. For example, the hosting server 12 may retrieve and store web pages 28 (shown in FIGS. 4 and 5) associated with one or more websites 26 in response to requests received by the user via the user computing device 22 to allow users to interact with the website and search and/or purchase products such as, for example, goods and/or services via the website. In one embodiment, the hosting server 12 is configured to generate and display web pages 28 associated with the website in response to requests being received from consumers via corresponding web browsers that are displayed on the user computing devices 22. For example, in one embodiment, the hosting server 12 may display a product search webpage 30 (shown in FIG. 4) in response to receiving a user request that allows a user to input a product search request including search criteria including one or more search terms. In addition, the hosting server 12 may transmit the product search request to the search engine server 14 and/or the sorting server 16 for use in generating search data and/or product lists in response to the user's search request. The hosting server 12 may also receive one or more product lists 32 (shown in FIG. 5) from the search engine server 14 and/or the sorting server 16 that includes information associated with products that are selected based on the user's search criteria. The hosting server 12 may also display a search results webpage 34 to display the product lists 32 to the user and to allow the user to select one or more of the displayed products for purchase.

In the illustrated embodiment, the search engine server 14 is configured to receive a product search request from the hosting server 12 including one or more search terms, and generate search data including a plurality of product records as a function of the search terms. For example, in one embodiment, the search engine server 14 may initiate a search algorithm based on a Boolean model to search product records contained in the database 20 based search terms received from the user. One system that provides a suitable system 10, including a search engine server 14 is disclosed in U.S. patent application Ser. No. 14/633,022, filed on Feb. 26, 2015 and U.S. patent application Ser. No. 14/671,817, filed on Mar. 27, 2015, which are hereby incorporated by reference.

Figure 2:
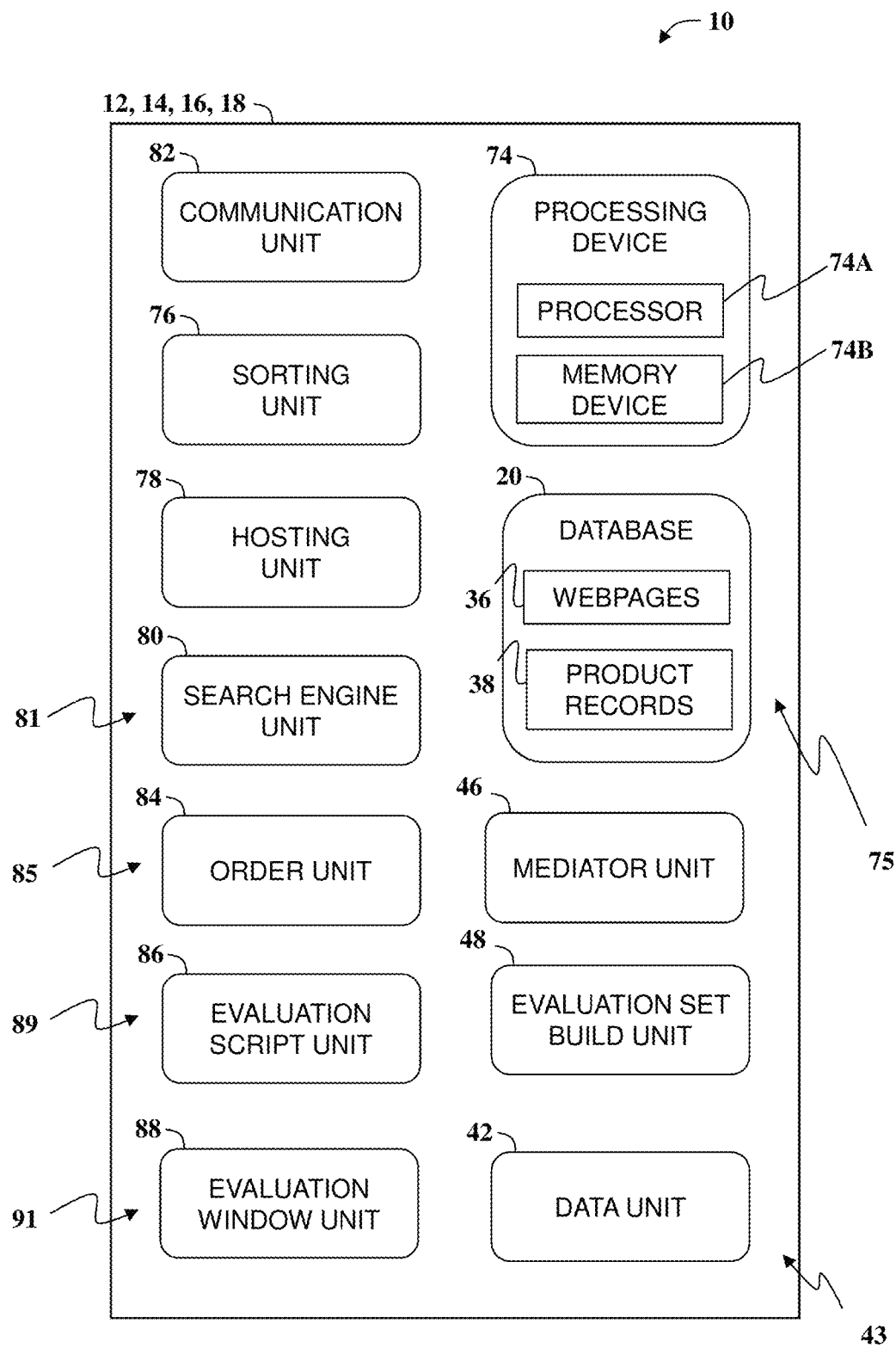
FIG. 2 is a schematic illustrating example components of a server, according to an embodiment of the present invention.

Referring to FIG. 2, in one embodiment, the system 10 may include a system server 72 that is configured to perform the functions of the hosting server 12, the search engine server 14, the sorting server 16, the database server 18 and/or the modulator application server 40. In the illustrated embodiment, the system server 72 includes a processing device 74 and the database 20.

The processing device 74 executes various programs, and thereby controls components of the system server 72 according to user instructions received from the user computing device 22. The processing device 74 may include a processor or processors 74A and a memory device 74B, e.g., read only memory (ROM) and random access memory (RAM), storing processor-executable instructions and one or more processors that execute the processor-executable instructions. In embodiments where the processing device 74 includes two or more processors 74A, the processors 74A can operate in a parallel or distributed manner. In an example, the processing device 74 may execute and/or implement a sorting unit 76, a hosting unit 78, a search engine unit 80, a communications unit 82, an order unit 84, an evaluation script unit 86, an evaluation window unit, a data unit 42, a mediator unit 46, and evaluation set build unit 48.

The memory device 74B may be configured to store programs and information in the database 20, and retrieving information from the database 20 that is used by the processor to perform various functions described herein. The memory device may include, but is not limited to, a hard disc drive, an optical disc drive, and/or a flash memory drive. Further, the memory device may be distributed and located at multiple locations.

The communications unit 82 retrieves various data and information from the database 20 and sends information to the user computing device 22 via the communications network 24 to enable the user to access and interact with the system 10. In one embodiment, the communications unit 82 displays various images on a graphical interface of the user computing device 22 preferably by using computer graphics and image data stored in the database 20 including, but not limited to, web pages, product records, sorted groups, product lists, and/or any suitable information and/or images that enable the system 10 to function as described herein.

The hosting unit 78 may be programmed to perform some or all of the functions of the hosting server 12 including hosting various web pages associated with one or more websites that are stored in the database 20 and that are accessible to the user via the user computing device 22. The hosting unit 78 may be programmed to generate and display web pages associated with a website in response to requests being received from users via corresponding web browsers.

The search engine unit 80 may be programmed to perform some or all of the functions of the search engine server 14 including generating and storing search data 36 in response to the user's product search request. In addition, the search engine unit 80 may also be programmed to generate a relevance score associated with each of the product records 38 included in the search data 36.

The sorting unit 76 may be programmed to perform some or all of the functions of the sorting server 16 including selecting a first sorting value and generating a first sorted group of product records as a function of the first sorting value, and selecting a second sorting value and generating a second sorted group as a function of the product records included in the first sorted group and the second sorting value. In addition, the sorting unit 76 may also be programmed to generate a product list as a function of the second sorted group and display the product list on a website in response to the product search request.

As discussed above, the search engine unit 80 is coupled to the memory device 74B and is configured to receive a product search request and receive, from the memory device 74B, search results data associated with the product search request. The search results data will generally include a plurality of product records. Each of the product records includes a price assigned with the associated product and other data associated with the product.

As discussed above, the memory device 74B is configured to store product data associated with a plurality of products, typically in the form of a product record. The product data may include pricing information and access information related to the plurality of products. In general, the access information provides information related to expressed customer interest in a product. For example, the access information may include, but is not limited to, (the number of) prior purchases by customers of the product, inclusion of the product in prior search results by customers, "clicks" or "click-throughs") by customers, i.e., selection of a hyperlink in the search results to access additional information about the product, and/or any combination thereof. The memory device may be further configured to store historical usage information related to usage of the commercial order module by a plurality of customers and a plurality of facets associated with the plurality of products. Each facet has a plurality of facet values.

The order unit 84 is coupled to the memory device 74B and the hosting unit 78 and is configured to generate the commercial product module 44. As discussed above, the commercial product module 44 may be an application or app running on the customer device or a website 28. The commercial product module 44 is sent over a computer network to, and viewable by the customer on, customer device 22. The commercial product module 44 allows the customer to enter a product search request via the commercial product module 44.

The search engine unit 80 is coupled to the memory device and the order unit 84. The search engine unit 80 is configured to receive the product search request from the order unit 84 and to receive, from the memory device 74B, search results data associated with the product search request. The (initial) search results data includes a subset of the plurality of products and at least one facet associated with the product search request.

In one embodiment of the present invention, the memory device 74B may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

The memory device 74B may be further configured to store an evaluation script and an evaluation set. The evaluation set defines an evaluation to be performed by a user with respect to search engine results corresponding to a predefined search on a first search engine. The evaluation set may include the parameters/characteristics of the search results to be evaluated. Examples of parameters/characteristics that may be evaluated may include, but are not limited to, (relevance of) the search results, color, (accuracy or relevance of) facets (color, size, type, gender, etc. . . . ) or any other information included in the search results. The evaluation set may further include information related to the evaluation window (see below), including information related to the display of the evaluation window relative to the search results page). The evaluation script is a set of instructions that when executed by the processor 74A displays the evaluation window and allows the user to enter evaluation data.

In one aspect of the present invention, multiple evaluation scripts and evaluation sets may be stored in the memory device 74B. Each evaluation set may be associated with, or assigned to, multiple users. The evaluation data from the multiple users associated with an evaluation set may be stored or tabulated together within the memory device 74B for later analysis. The evaluation data may be used to revise and/or correct deficiencies within the search engine, the associated logic and/or the underlying data.

The evaluation script unit 86 is coupled to the memory device 74B and is configured to receive a search engine search request and to detect a reference to the evaluation script in the search engine search request. The evaluation script unit 86 may be coupled to the search engine 80. The evaluation script unit 86 is further is configured to detect the reference to the evaluation script, to retrieve the evaluation script from the memory device 74B. The search engine search request is passed to the search engine 80 which performs the designated search and returns search engine results corresponding to the predefined search on the search engine. The search engine results are then displayed to the user in a first search results page.

In one embodiment, the search engine request is embodied in a universal resource locator (URL) address that includes the reference to the evaluation script. The URL address will typically point to a resource located in one locations, e.g., the hosting server 12, while the evaluation script will be located at a different location, e.g., the modulator application server 40.

The evaluation window unit 88 is coupled to the evaluation script unit 86 and is configured to display to the user an evaluation window relative to the first search results. As explained more fully below, the evaluation window is configured to allow the user to enter evaluation data of the search results as defined by the evaluation set.

In one embodiment, the search engine request, i.e., the URL, is entered into a web browser, running on the user/evaluator's user device 22 that is capable of integrating the web page including the search results and the evaluation window.

The data unit 42 is coupled to the evaluation window 88 and the memory device 78A and is configured to receive the evaluation data entered by the user in the evaluation window and to store the evaluation data in the memory device 74B (along with the evaluation set). As discussed above, the evaluation data entered by the plurality of users assigned to the evaluation set may be stored or tabulated together within the storage device 74B.

Figure 5:
FIG. 5 is an illustration of an exemplary screenshot from the system of FIG. 1, according to an embodiment of the present invention'
Figure 6:
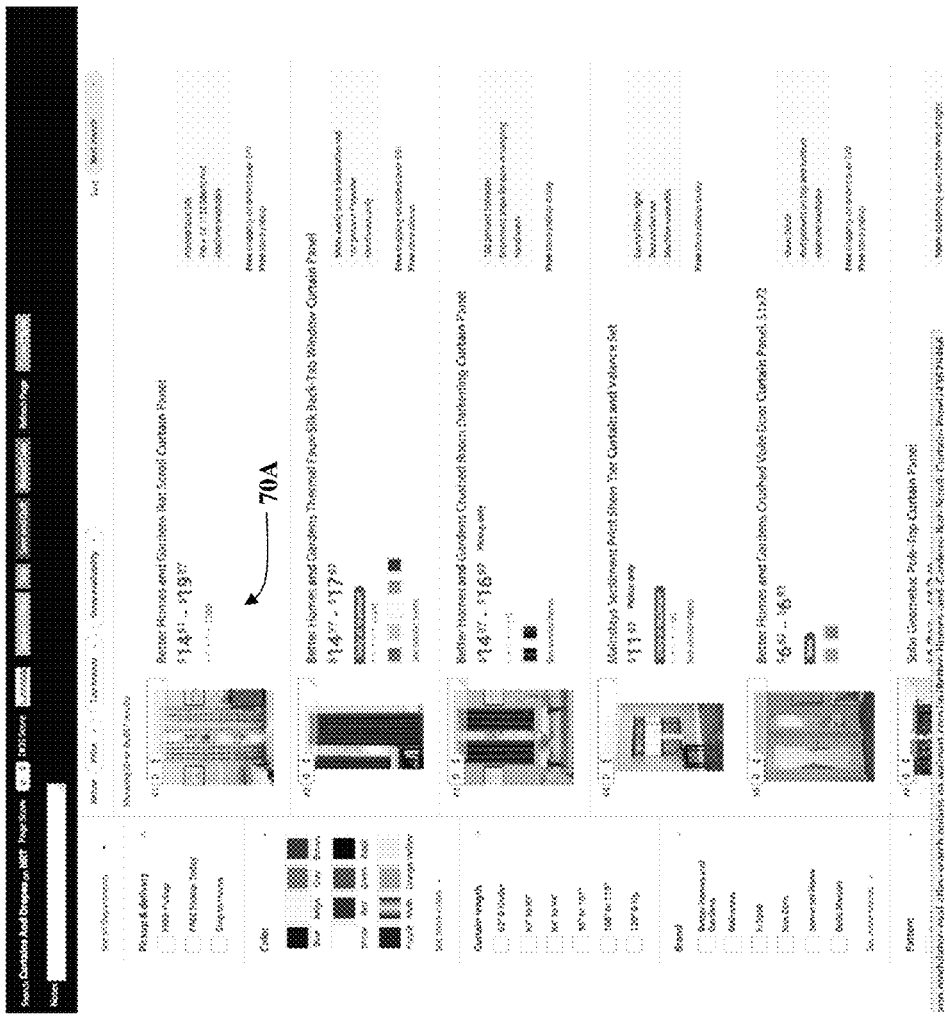
FIG. 6 is an illustration of an exemplary screenshot, illustrating a search results page and an evaluation window from the system of FIG. 1, according to an embodiment of the present invention.
Figure 7:
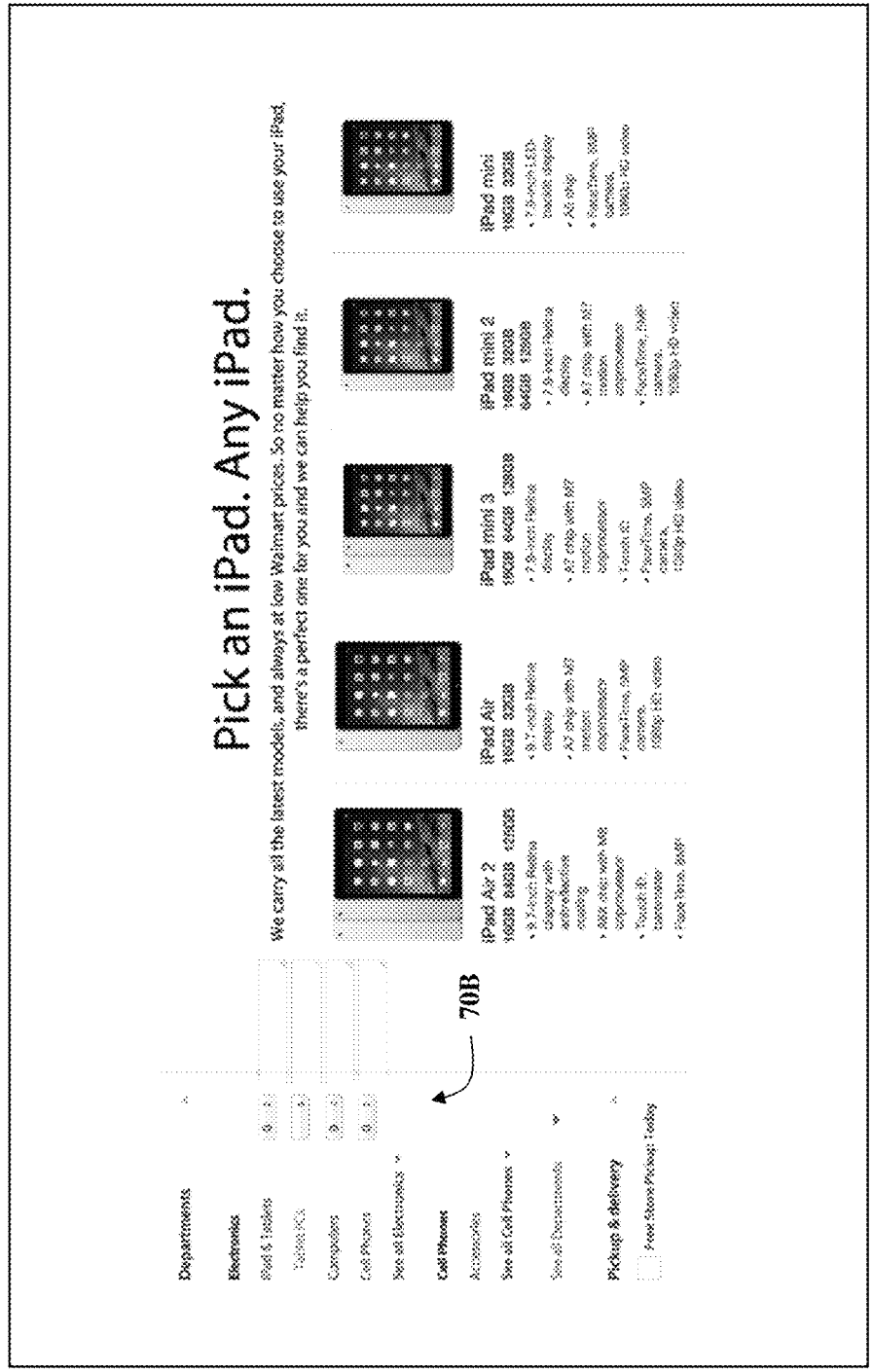
FIG. 7 is an illustration of an exemplary screenshot, illustrating a search results page and an evaluation window from the system of FIG. 1, according to an embodiment of the present invention; and, FIG. 8 is a process diagram of an evaluation method, according to an embodiment of the present invention.

With reference to FIGS. 5 and 6, in one embodiment of the present invention, an evaluation window 70A is displayed along with the search results webpage 26, 28, 44. The webpage 26, 28, 44 and the evaluation window 70A, 70B may be linked such that when one is moved on the user's display, the other moves along with it. In another embodiment, the web page 26, 28, 44 and the evaluation windows 70A may be moved independently. As shown, the evaluation window may include text entry boxes for the entry of notes and/or entry points for each item in the evaluation set that allows the user to enter a rating for that item. In the illustrated embodiment, the entry point includes a dropdown list that allows the user to enter a numeric rating. In the illustrated embodiment, a user's numeric rating is between (and including) +2 to −2.

As shown, the evaluation window 70A, 70B may be displayed as an overlay. The evaluation window 70A, 70B may be semi-transparent such that the underlying webpage 26, 28, 44 is visible. The overlay evaluation window 70B may include one or more entry points for each item in the evaluation set that allows the user to enter a rating for that item and one or more text entry boxes for the entry of text notes.

In another aspect of the present invention, the evaluation set includes information detailing how the evaluation window 70A, 70B and/or the elements thereof, are to be displayed relative to the web page 26, 28, 44. The evaluation windows 70A, 70B may include a scroll bar to display additional information and/or navigation buttons (not shown) to allow the user to navigate through the evaluation button. For example, the evaluation window 70A, 70B may include multiple pages that may be navigated via "NEXT" and "BACK" buttons. A "DONE" button may be used to finish and exit the evaluation window 70A, 70B.

In another aspect of the present invention, each evaluation set may include a second evaluation to be performed by the user with respect to the predefined search on a second search engine. For example, for comparison purposes the same evaluation may be performed by the user on the search results using the same search on a different search engine. The first search engine may be associated with a first entity and the different or second search engine may be associated with a second entity. The first and second entities may be, for example, competitors. The evaluation of the first and second search engines may be used for comparison purposes.

Alternatively, the first and second search engines may be different versions of a search engine. For example, one or both of the first and second search engines may be pre-production or development versions of a search engine. The evaluation may be run against two development versions or between a production search engine and a revised/pre-production search engine for comparison purposes.

Returning to FIG. 2, in another aspect of the present invention, the system 10 may include a mediator unit 46. The mediator unit 46 is configured to synchronize and/or transfer data entered by the user between the first and second evaluations windows. In one embodiment, the mediator unit 46 utilizes the local store feature of HTML 5, or a similar feature. For example, in one embodiment, for a particular parameter or characteristic that is the same across the first and second search results (corresponding to the first and second search engines, respectively), the mediator unit 46, in response to the user entering evaluation data in one of the evaluation windows, automatically enters the same evaluation data in the same window. In a similar manner, the mediator unit 46 may also synchronize navigational inputs (forward, back, next, scrolling) across evaluation windows. This synchronization function may be turned on/off by the user. For example, in one embodiment, the web browser is capable of interpreting a web page in HTML 5 and the reference to the evaluation script utilizes the local storage feature of HTML 5 to allow communication between multiple evaluation windows, e.g., simultaneous scrolling, saving, updating, scoring/ranking, etc. . . . . .

As shown in FIG. 2, the system 10 may include an evaluation set build unit 48 that is coupled to the memory device 74B and is configured to allow a build user to define the predefined search and the evaluation set and to store the search and evaluation set in the memory device 74B.

Figure 3:
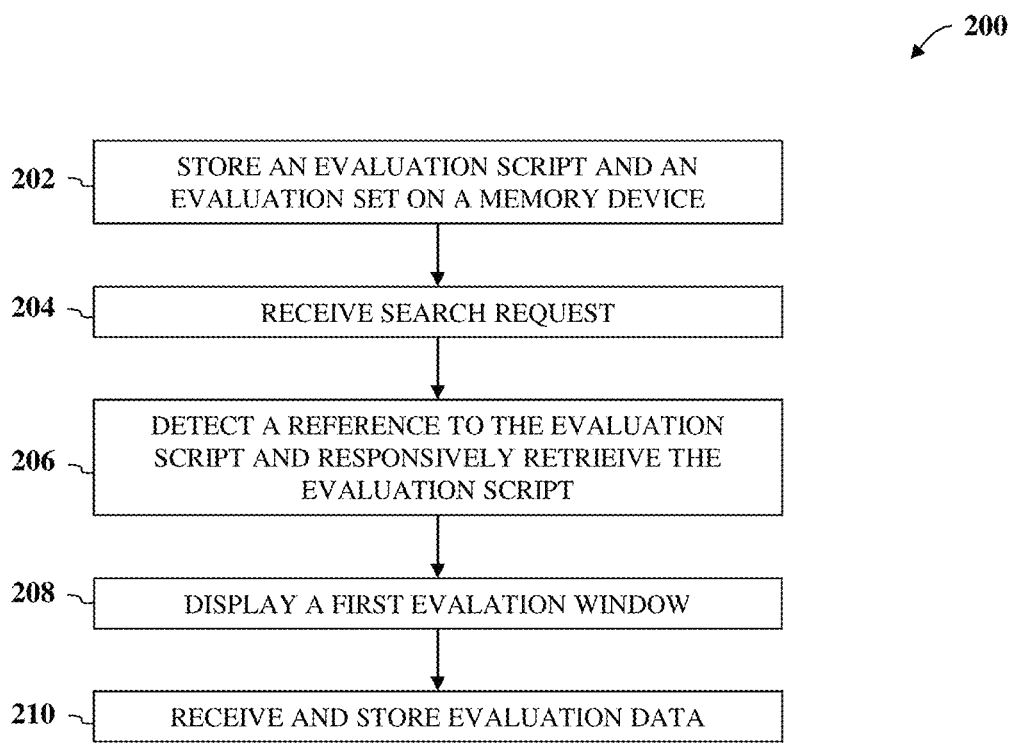
FIG. 3 is a flowchart of a method that may be used with the system shown in FIG. 1, according to an embodiment of the present invention.

FIG. 3 is a flowchart of method 200 that may be used with the system 10 to allow users (evaluators) to evaluate search engine results, including the underlying logic and the data. The method includes a plurality of steps. Each method step may be performed independently of, or in combination with, other method steps. Portions of the method may be performed by any one of, or any combination of, the components of the system 10.

In a first step 202, one or more evaluation scripts and one or more evaluation sets are stored in the memory device 74B. Each evaluation set defines an evaluation to be performed by a user with respect to search engine results corresponding to a predefined search on a search engine. Each evaluation set may be assigned to one or more users.

In a second step, 204, a search engine search request is received at an evaluation script unit coupled to the memory device. The search engine search request may include a reference to one of the evaluation scripts stored in the memory device 74B.

In a third step 206, if the reference to the evaluation script in the search engine search request is detected, the evaluation script is retrieved from the memory device. The search engine results corresponding to the predefined search on the first search engine are displayed to the user in a search results page.

In a fourth step 208, an evaluation window is displayed to the user. In one embodiment, the evaluation window is displayed relative to the search results page. The evaluation window is configured to allow the user to enter evaluation data of the search results as defined by the evaluation set.

In a fifth step 210, evaluation data entered by the user is received and stored in the memory device 74B.

Returning to FIG. 2, in still a further embodiment of the present invention, the system 10 may include a memory means 75, evaluation script means 89, evaluation window means 91, and data means 43.

The memory means 75 may include, but is not limited to the memory device 74 and database 20. The memory means 75 may be implemented via read only memory (ROM) and random access memory (RAM), a hard disc drive, a solid state drive (or hybrid thereof), an optical disc drive, and/or a flash memory drive. Further, the memory means 75 may be distributed and located at multiple locations. The memory means 75 performs the functions of storing an evaluation script and an evaluation set. The evaluation set defining an evaluation to be performed by a user with respect to search engine results corresponding to a predefined search on a first search engine The evaluation script means 89 may be implemented, at least in part, by the processing device 74, including the processor or processors 74A and the memory device 74B. The evaluation script means 89 performs the functions of receiving a search engine search request and detecting a reference to the evaluation script in the search engine search request. The evaluation script means 89 further performs the functions of detecting the reference to the evaluation script, for retrieving the evaluation script from the memory device. The search engine results correspond to the predefined search on the first search engine are displayed to the user in a first search results page.

The evaluation window means 91 may be implemented, at least in part, by the processing device 74, including the processor or processors 74A and the memory device 74B. The evaluation window means 91 performs the functions of displaying to the user an evaluation window relative to the first search result. The first evaluation window is configured to allow the user to enter evaluation data of the search results as defined by the evaluation set.

The data means 43 may be implemented, at least in part, by the processing device 74, including the processor or processors 74A and the memory device 74B. The data means 43 performs the receiving evaluation data entered by the user and storing the evaluation data in the memory means.

INDUSTRIAL APPLICABILITY

Figure 8:
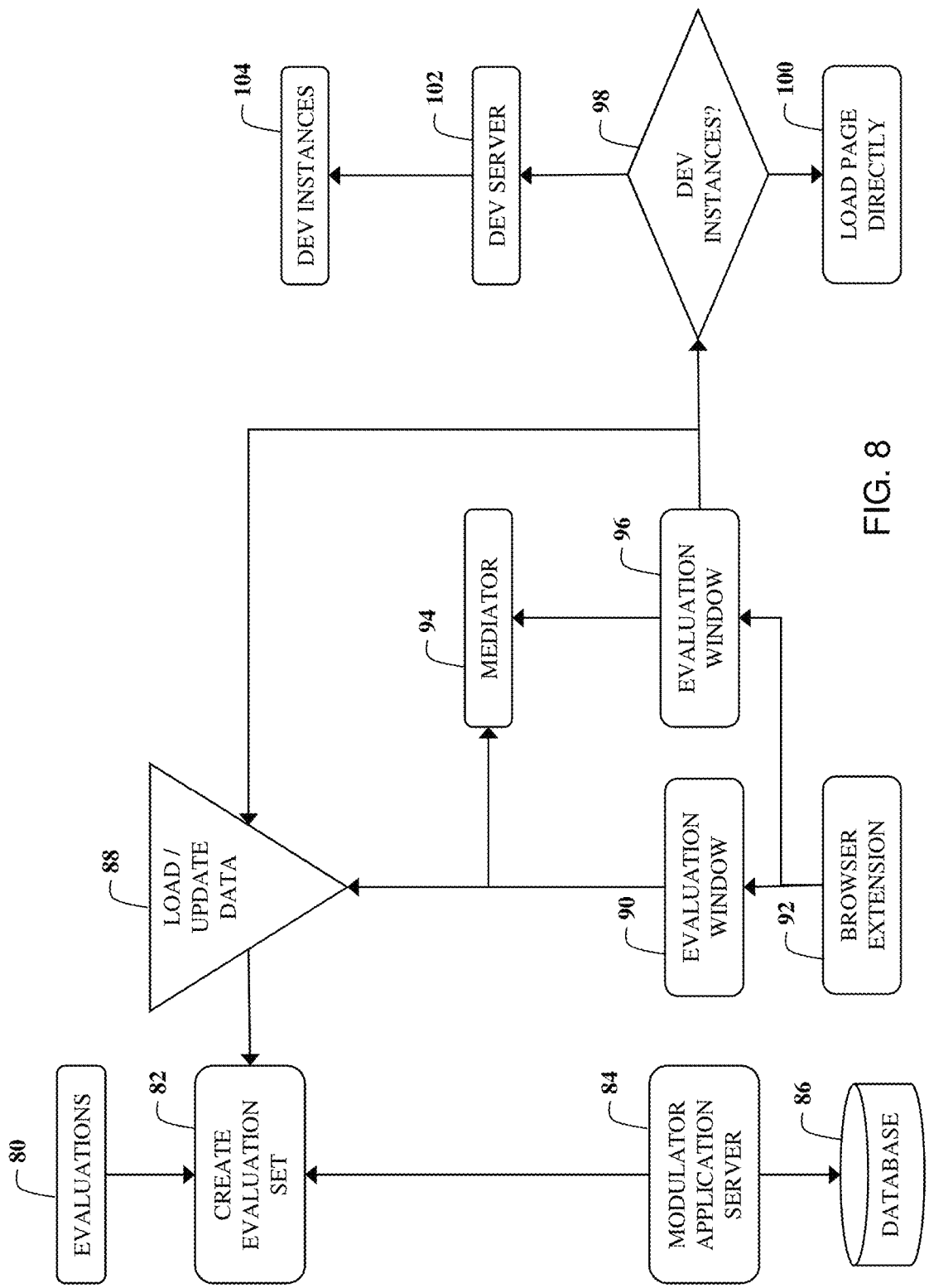

With reference to FIG. 8, operation of the system 10 according to one embodiment is shown. The system 10 may be used by a plurality of users to perform a series of evaluations 80. A build user creates the evaluations and stores the evaluations, as evaluation sets, in a database 86 through a modulator application server 84. As discussed above, the evaluations 80 may be used to evaluate defined parameters or characteristics of a search engine, including the frontend and backend logic, search engine logic, and the data. The evaluations may have a narrow defined scope or may entail a more encompassing broader analysis/review. In one aspect of the present invention, each evaluation may have an associated type, e.g., merchandise modules, recall items, facets, departments, flyout, etc. . . . . . The system 10 is scalable and may advantageously be applicable to the real world evaluation of any website/search engine. The system 10 does not require that a copy or mimicked version of the website/search engine be created or used.

In another aspect of the present invention, an evaluation may target a single search engine or website (that includes a search engine) or may target a plurality of search engines/websites (typically two) for comparison purposes. For examples of search engines/websites that may be compared using the system 10 are a search engine/website associated with a first entity, a search engine/website associated with a competitor, search engine/website associated with an entity associated with the first entity, e.g., a website/search engine hosted by the first entity on behalf of another entity, and a pre-production/developer version of the website/search engine (for example, to evaluate new features).

The evaluation may further target one or more of different page types, for example a query search results, a browse search page, and/or a category search page. The evaluation(s) may also be given an associated context, e.g., DVD, Blu-Ray, televisions, HD televisions, etc. . . . . .

To perform an evaluation, a user/evaluator runs or executes a provided search engine search request in web browser. In one embodiment, the search engine search request includes a URL and a reference to an evaluation script. In response to the reference to the evaluation script, the evaluation script is retrieved from the database 86. In one embodiment, the evaluation script is written in JavaScript which may require a browser extension 72 to execute. For example, the script may be stored in a bookmarklet, i.e., a bookmark stored in the web browser that contains JavaScript commands that is automatically loaded via the local store feature. As discussed above, since the search engine may be located remote from the modulator application server 84 and the database 86, the web browser, script and browser extension work together to integrate the search results page and the evaluation window(s). In one embodiment, the present invention utilizes the local storage feature of HTML 5 to integrate the search results page and the evaluation window(s).

As shown, the evaluation script causes one or more evaluation windows 90, 96. The evaluation window(s) 90, 96 may be associated with corresponding search results page(s) and are displayed to the user relative to the corresponding search results page(s). The user, via the evaluation window(s) 90, 96, may enter evaluation data which is then loaded/updated 88 and stored in the database 86. The evaluation data is associated with the corresponding evaluation set within the database for later tabulation/analysis along with the evaluations from other users.

A mediator 94 may be used to synchronize or transfer data between evaluation window(s) 90, 96.

If the search engine search request references a pre-production/developer instance of a search engine (98), then the referenced instance 104 is retrieved from a developer server 102. Otherwise, the search results page is loaded directly 100.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system, comprising:
a memory device configured to store an evaluation script and an evaluation set, the evaluation set comprising:
a first evaluation to be performed by a user with respect to first search engine results corresponding to a predefined search on a first search engine; and
a second evaluation to be performed by the user with respect to second search engine results corresponding to the predefined search on a second search engine different than the first search engine;
an evaluation script unit coupled to the memory device, the evaluation script unit configured to:
receive a search engine search request comprising the predefined search;
detect a reference to the evaluation script in the search engine search request; and
in response to detecting the reference to the evaluation script, retrieve the evaluation script from the memory device, wherein:
the first search engine results corresponding to the predefined search on the first search engine are displayed to the user in a first search results page; and
the second search engine results corresponding to the predefined search on the second search engine are displayed to the user in a second search results page;
an evaluation window unit coupled to the evaluation script unit, the evaluation window unit configured to simultaneously display to the user:
a first evaluation window relative to the first search engine results, the first evaluation window configured to allow the user to enter first evaluation data of the first search engine results as defined by the evaluation set; and
a second evaluation window relative to the second search engine results, the second evaluation window configured to allow the system to enter second evaluation data of the second search engine results as defined by the evaluation set;
a data unit coupled to the evaluation window unit and the memory device, the data unit configured to:
receive the first evaluation data of the first search engine results entered by the user; and
store the first evaluation data of the first search engine results in the memory device; and
a mediator unit coupled to the first and second evaluation windows, the mediator unit configured to:
retrieve, from the memory device, the first evaluation data of the first search engine results entered into the first evaluation window; and
when the first search engine results are identical to the second search engine results, automatically enter the first evaluation data of the first search engine results into the second evaluation window as the second evaluation data of the second search engine results.

2. A system, as set forth in claim 1, wherein the first search engine and the second search engine are associated with different entities.

3. A system, as set forth in claim 1, wherein the first search engine and the second search engine are different versions of a same search engine.

4. A system, as set forth in claim 1, wherein the predefined search includes one or more of a key word request, a page request, and a category request.

5. A system, as set forth in claim 1, wherein the evaluation set includes one or more parameters of the predefined search.

6. A system, as set forth in claim 5, wherein the first evaluation data includes a user entered ranking associated with each parameter of the one or more parameters.

7. A system, as set forth in claim 6, wherein the first evaluation data includes user entered notes associated with at least one parameter of the one or more parameters.

8. A system, as set forth in claim 1, further compromising an evaluation set build unit coupled to the memory device, the evaluation set build unit configured to allow a build user to define the predefined search and the evaluation set.

9. The system of claim 1, wherein the mediator unit is further configured to:
in response to receiving a navigational input from the user performed on the first evaluation window, perform an identical navigational action in the second evaluation window.

10. The system of claim 1, wherein the mediator unit is further configured to:
in response to receiving an input from the user moving a window comprising the first search engine results, move the first evaluation window in an identical manner.

11. A method, comprising:
storing, on a memory device, an evaluation script and an evaluation set, the evaluation set comprising:
a first evaluation to be performed by a user with respect to first search engine results corresponding to a predefined search on a first search engine; and
a second evaluation to be performed by the user with respect to second search engine results corresponding to the predefined search on a second search engine different than the first search engine;
receiving, at an evaluation script unit coupled to the memory device, a search engine search request comprising the predefined search;
detecting a reference to the evaluation script in the search engine search request;
in response to detecting the reference to the evaluation script, retrieving the evaluation script from the memory device, wherein:
the first search engine results corresponding to the predefined search on the first search engine are displayed to the user in a first search results page; and
the second search engine results corresponding to the predefined search on the second search engine are displayed to the user in a second search results page;
simultaneously displaying to the user:
a first evaluation window relative to the first search engine results, the first evaluation window configured to allow the user to enter first evaluation data of the first search engine results as defined by the evaluation set; and
a second evaluation window relative to the second search engine results, the second evaluation window configured to allow a system to enter second evaluation data of the second search engine results as defined by the evaluation set;
receiving the first evaluation data entered by the user;
storing the first evaluation data in the memory device;
retrieving, from the memory device, the first evaluation data entered into the first evaluation window; and
when the first search engine results are identical to the second search engine results, automatically entering the first evaluation data of the first search engine results into the second evaluation window as the second evaluation data of the second search engine results.

12. A method, as set forth in claim 11, wherein the first search engine and the second search engine are associated with different entities.

13. A method, as set forth in claim 11, wherein the first search engine and the second search engine are different versions of a same search engine.

14. A method, as set forth in claim 11, wherein the predefined search includes one or more of a key word request, a page request, and a category request.

15. A method, as set forth in claim 11, wherein the evaluation set includes one or more parameters of the predefined search.

16. A method, as set forth in claim 15, wherein the first evaluation data includes a user entered ranking associated with each parameter of the one or more parameters.

17. A method, as set forth in claim 16, wherein the first evaluation data includes user entered notes associated with at least one parameter of the one or more parameters.

18. A method, as set forth in claim 11, further comprising: allowing a build user to define the predefined search and the evaluation set.

19. The method of claim 11 further comprising:
in response to receiving a navigational input from the user performed on the first evaluation window, performing an identical navigational action in the second evaluation window.

20. The method of claim 11 further comprising:
in response to receiving an input from the user moving a window comprising the first search engine results, moving the first evaluation window in an identical manner.

21. One or more non-transitory computer-readable storage media, having computer-executable instructions embodied thereon, wherein when executed by at least one processor, the computer-executable instructions cause the processor to operate as:
a memory device configured to store an evaluation script and an evaluation set, the evaluation set comprising:
a first evaluation to be performed by a user with respect to first search engine results corresponding to a predefined search on a first search engine; and
a second evaluation to be performed by the user with respect to second search engine results corresponding to the predefined search on a second search engine different than the first search engine;
an evaluation script unit coupled to the memory device, the evaluation script unit configured to:
receive a search engine search request comprising the predefined search;
detect a reference to the evaluation script in the search engine search request; and
in response to detecting the reference to the evaluation script, retrieve the evaluation script from the memory device, wherein:
the first search engine results corresponding to the predefined search on the first search engine are displayed to the user in a first search results page; and
the second search engine results corresponding to the predefined search on the second search engine are displayed to the user in a second search results page;
an evaluation window unit coupled to the evaluation script unit, the evaluation window unit configured to simultaneously display to the user:
a first evaluation window relative to the first search engine results, the first evaluation window configured to allow the user to enter first evaluation data of the first search engine results as defined by the evaluation set; and
a second evaluation window relative to the second search engine results, the second evaluation window configured to allow a system to enter second evaluation data of the second search engine results as defined by the evaluation set;
a data unit coupled to the evaluation window unit and the memory device, the data unit configured to:
receive the first evaluation data of the first search engine results entered by the user; and
store the first evaluation data of the first search engine results in the memory device; and
a mediator unit coupled to the first and second evaluation windows, the mediator unit configured to:
retrieve, from the memory device, the first evaluation data of the first search engine results entered into the first evaluation window; and
when the first search engine results are identical to the second search engine results, automatically enter the first evaluation data of the first search engine results into the second evaluation window as the second evaluation data of the second search engine results.

22. The one or more non-transitory computer-readable storage media of claim 21, wherein the mediator unit is further configured to:
in response to receiving a navigational input from the user performed on the first evaluation window, perform an identical navigational action in the second evaluation window.

23. The one or more non-transitory computer-readable storage media of claim 21, wherein the mediator unit is further configured to:
in response to receiving an input from the user moving a window comprising the first search engine results, move the first evaluation window in an identical manner.

24. A system, comprising:
a memory device means for storing an evaluation script and an evaluation set, the evaluation set comprising:
a first evaluation to be performed by a user with respect to first search engine results corresponding to a predefined search on a first search engine; and
a second evaluation to be performed by the user with respect to second search engine results corresponding to the predefined search on a second search engine different than the first search engine;
an evaluation script means for:
receiving a search engine search request comprising the predefined search;
detecting a reference to the evaluation script in the search engine search requests; and
in response to detecting the reference to the evaluation script, retrieving the evaluation script from the memory device means, wherein:
the first search engine results corresponding to the predefined search on the first search engine are displayed to the user in a first search results page; and the second search engine results corresponding to the predefined search on the second search engine are displayed to the user in a second search results page;

an evaluation window means for simultaneously displaying to the user:
- a first evaluation window relative to the first search engine results, the first evaluation window configured to allow the user to enter first evaluation data of the first search engine results as defined by the evaluation set; and
- a second evaluation window relative to the second search engine results, the second evaluation window configured to allow the system to enter second evaluation data of the second search engine results as defined by the evaluation set;

a data means for:
- receiving the first evaluation data of the first search engine results entered by the user; and
- storing the first evaluation data of the first search engine results in the memory device means; and a mediator means coupled to the first and second evaluation windows, the mediator means for:
- retrieving, from the memory device means, the first evaluation data of the first search engine results entered into the first evaluation window; and
- when the first search engine results are identical to the second search engine results, automatically entering the first evaluation data of the first search engine results into the second evaluation window as the second evaluation data of the second search engine results.

25. The system of claim 24, wherein the mediator means is further for:
in response to receiving a navigational input from the user performed on the first evaluation window, performing an identical navigational action in the second evaluation window.

26. The system of claim 24, wherein the mediator means is further for:
in response to receiving an input from the user moving a window comprising the first search engine results, moving the first evaluation window in an identical manner.

* * * * *